United States Patent
Mihm et al.

(10) Patent No.: US 11,022,531 B2
(45) Date of Patent: Jun. 1, 2021

(54) SEAT BELT TEST APPARATUS

(71) Applicant: GM Global Technology Operations LLC, Detroit, MI (US)

(72) Inventors: Russell J. Mihm, Beverly Hills, MI (US); Jiri Kral, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 161 days.

(21) Appl. No.: 16/180,317

(22) Filed: Nov. 5, 2018

(65) Prior Publication Data
US 2020/0141848 A1    May 7, 2020

(51) Int. Cl.
*G01N 3/303* (2006.01)
*B60R 22/00* (2006.01)
*G01N 3/30* (2006.01)
*G01M 7/08* (2006.01)

(52) U.S. Cl.
CPC .............. *G01N 3/303* (2013.01); *B60R 22/00* (2013.01); *G01M 7/08* (2013.01); *G01N 3/30* (2013.01); *G01N 2203/0033* (2013.01); *G01N 2203/0282* (2013.01); *G01N 2203/0623* (2013.01)

(58) Field of Classification Search
CPC .. G01N 3/303; G01N 3/30; G01N 2203/0033; G01N 2203/0623; G01M 7/08
USPC ...................................................... 73/12.06
See application file for complete search history.

(56) References Cited

U.S. PATENT DOCUMENTS

| | | | | |
|---|---|---|---|---|
| 5,058,244 A | * | 10/1991 | Fernandez | A44B 11/12 24/136 K |
| 5,965,827 A | * | 10/1999 | Stanley | G01L 5/10 73/862.391 |
| 7,242,286 B2 | * | 7/2007 | Knox | B60R 22/48 340/457.1 |
| 8,635,918 B2 | * | 1/2014 | Lanter | B60R 22/48 73/862.453 |
| 8,707,757 B2 | | 4/2014 | Kral et al. | |
| 10,724,911 B1 | * | 7/2020 | Lawson | B65G 23/44 |
| 2013/0233050 A1 | * | 9/2013 | Kral | G01L 5/04 73/12.13 |
| 2020/0141848 A1 | * | 5/2020 | Mihm | G01M 99/008 |

FOREIGN PATENT DOCUMENTS

| | | |
|---|---|---|
| CN | 104819854 A | 8/2015 |
| DE | 2750296 A1 | 5/1979 |
| DE | 102013203356 A1 | 9/2013 |

* cited by examiner

*Primary Examiner* — Clayton E. LaBalle
*Assistant Examiner* — Kevin C Butler

(57) ABSTRACT

A seat belt test apparatus for testing a safety restraint system for a vehicle comprises a first, a second, and a third test stand, an impactor apparatus, and a resistor apparatus. The first, a second, and a third test stand are selectively fixed to a test bench. The first, second and third test stands each comprises a pulley disposed proximate a top end of each of the first, second, and third test stand. The first test stand further comprises a first pretensioner mount. The third test stand further comprises a second pretensioner mount.

18 Claims, 7 Drawing Sheets

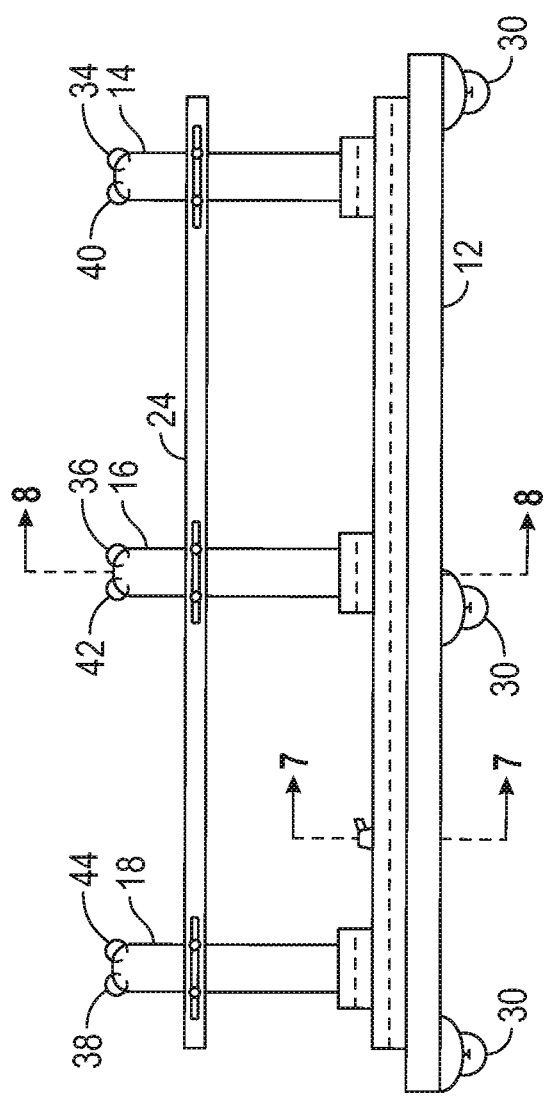
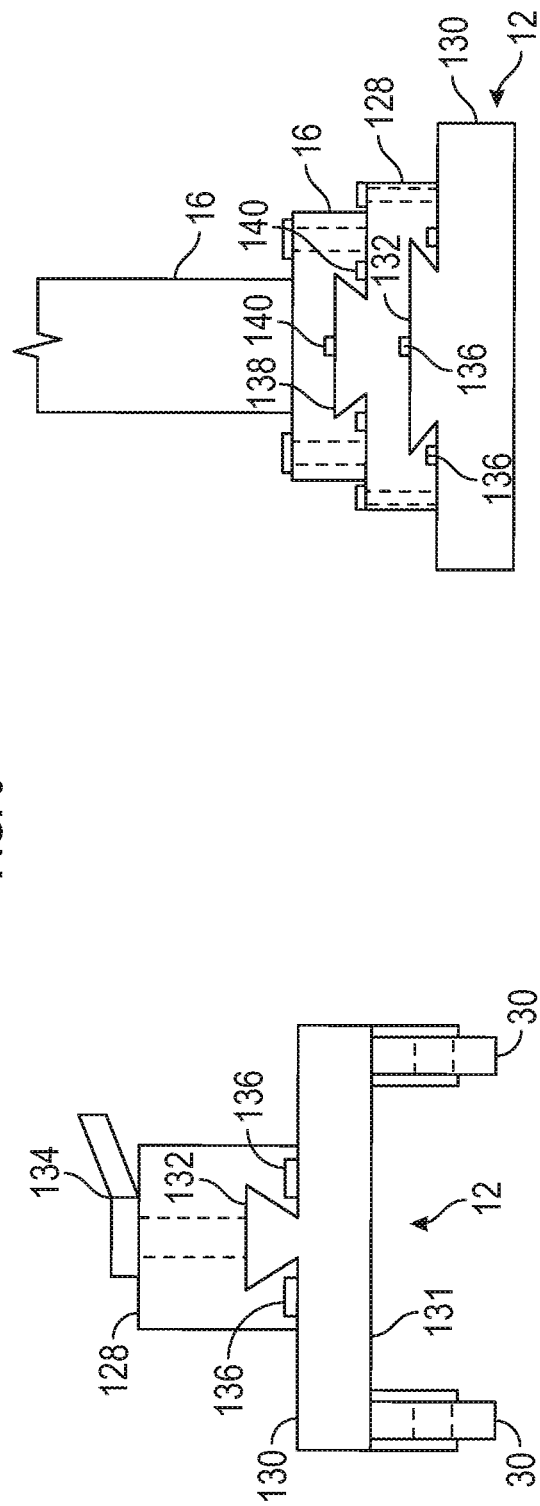

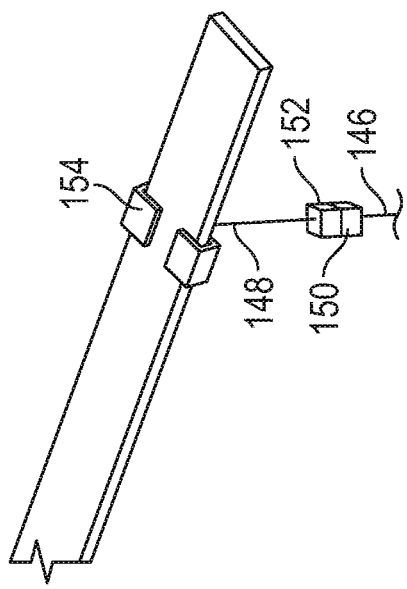
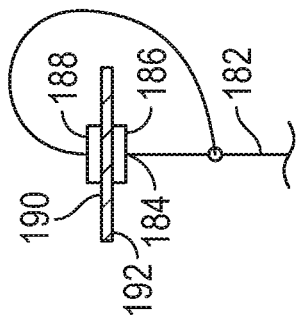
FIG. 16
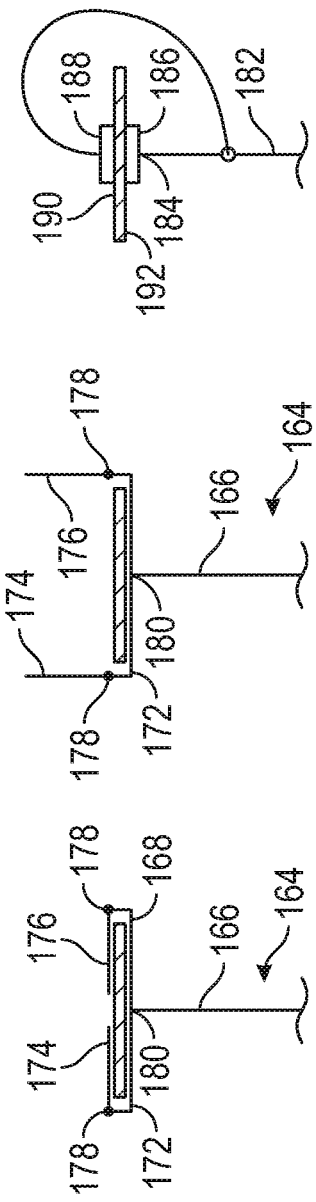
FIG. 15
FIG. 12
FIG. 14
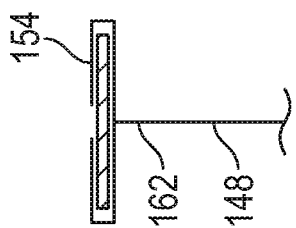
FIG. 13

SEAT BELT TEST APPARATUS

INTRODUCTION

The present disclosure relates generally to automotive testing apparatus and more particularly to a bench test apparatus for testing the automotive safety restraint systems.

Vehicle safety restraint systems include a length of belt defining a lap belt portion that extends horizontally across the lower torso and a shoulder belt portion that extends diagonally across the upper torso. The outboard end of the shoulder belt portion slides through a ring mounted high on the vehicle pillar and is wound within a retractor mounted low on the vehicle pillar. The outboard end of the lap belt portion is suitably mounted low on the pillar, seat or floor. A latch plate is provided at the junction of the inboard end of the shoulder belt portion and lap belt portion and is latched in a buckle mounted inboard the seat.

The seat belt system utilizes a retractor with a spring biased reel that winds the belt taut about the occupant, and an inertia locking mechanism that locks the reel against unwinding rotation upon onset of a deceleration event. Additional features in more advanced systems include a pretensioner that will react to the deceleration event by pulling or reeling in a length of belt to tighten the belt about the occupant before locking against unwinding rotation. In addition, more sophisticated systems have a load limiter that limits the load experienced by the belted occupant.

Accordingly, there is room in the art for new and improved test apparatus in which the various components or features of safety restraint systems are tested to collect data related to overall performance of the safety restraint system.

SUMMARY

The present disclosure provides a seat belt test apparatus for testing a safety restraint system for a vehicle the seat belt test apparatus comprises a first, a second, and a third test stand, an impactor apparatus, and a resistor apparatus. The first, a second, and a third test stand are selectively fixed to a test bench. The first, second and third test stands each comprises a pulley disposed proximate a top end of each of the first, second, and third test stand. The first test stand further comprises a first pretensioner mount. The third test stand further comprises a second pretensioner mount.

The impactor apparatus is mounted between the second and third test stand. The impactor apparatus comprises an impactor head, a first and a second side rail, a release mechanism, and a limit switch.

The resistor apparatus is disposed between the first and second test stands and comprises a mass disposed on a belt of the safety restraint system.

In one example of the present disclosure, the seat belt test apparatus further includes a stabilizer bar selectively mounted to each of the first, second and third test stands. The resistor apparatus is further disposed on the stabilizer bar.

In another example of the present disclosure, each of the first and second pretensioner mounts comprises one of a first and a second load cells.

In yet another example of the present disclosure, the first and third test stands further comprise a first and second belt displacement sensor disposed on the top end of the first and third test stands, respectively.

In yet another example of the present disclosure, the seat belt test apparatus further comprises a control module having electronic communication with the limit switch, the first and second load cells, and at least one of a lap pretensioner and a retractor pretensioner of the safety restraint system.

In yet another example of the present disclosure, each of the first and second test stands further comprises one of a first and a second belt damper.

In yet another example of the present disclosure, the test bench comprises a plurality of casters.

In yet another example of the present disclosure, the first pretensioner mount comprises one of a horizontal mount bracket and a pivot mount bracket.

In yet another example of the present disclosure, the test bench comprises a test plate and a bed plate. The test plate is mounted to the bed plate with a first dovetail sliding joint and a first plurality of bearings is disposed between the test plate and bed plate.

In yet another example of the present disclosure, the first, second and third test stands are mounted to the test plate with a second, third and fourth dovetail sliding joint, respectively. A second, a third, and a fourth plurality of bearings are disposed between the first, second and third test stands and the test plate, respectively.

The present disclosure also provides a seat belt test apparatus for testing a safety restraint system for a vehicle the seat belt test apparatus comprises a first, a second, and a third test stand, an impactor apparatus, a resistor apparatus and a control module. The first, a second, and a third test stand are selectively fixed to a test bench. The first, second and third test stands each comprises a pulley disposed proximate a top end of each of the first, second, and third test stand. The first test stand further comprises a first pretensioner mount and a first belt displacement sensor. The third test stand further comprises a second pretensioner mount and a second belt displacement sensor. Each of the first and second pretensioner mounts comprises one of a first and a second load cells.

The impactor apparatus is mounted between the second and third test stand. The impactor apparatus comprises an impactor head, a first and a second side rail, a release mechanism, and a limit switch.

The resistor apparatus disposed between the first and second test stands, the resistor apparatus comprising a mass disposed on a belt of the safety restraint system.

The control module has electronic communication with the limit switch, the first and second load cells, and at least one of a lap pretensioner and a retractor pretensioner of the safety restraint system.

In one example of the present disclosure, the seat belt test apparatus further includes a stabilizer bar selectively mounted to each of the first, second and third test stands. The resistor apparatus is further disposed on the stabilizer bar.

In another example of the present disclosure, each of the first and second test stands further comprises one of a first and a second belt damper.

In yet another example of the present disclosure, the resistor apparatus includes at least a first strap, a second strap, a first magnet, a second magnet, and a belt clamp. A first end of the first strap is fixed to the stabilizer bar. The belt clamp is fixed to a first end of the second strap and encloses the belt of the safety restraint system. The first magnet is fixed to the second end of the first strap. The second magnet is fixed to the second end of the second strap. The first and second magnets are disposed in contact and exert a magnetic force on each other.

In yet another example of the present disclosure, the first pretensioner mount comprises one of a horizontal mount bracket and a pivot mount bracket.

In yet another example of the present disclosure, the test bench comprises a test plate and a bed plate, the test plate is mounted to the bed plate with a first dovetail sliding joint and a first plurality of bearings is disposed between the test plate and bed plate.

In yet another example of the present disclosure, the first, second and third test stands are mounted to the test plate with a second, third and fourth dovetail sliding joint, respectively. A second, a third, and a fourth plurality of bearings are disposed between the first, second and third test stands and the test plate, respectively.

The present disclosure also provides a seat belt test apparatus for testing a safety restraint system for a vehicle the seat belt test apparatus comprises a first, a second, and a third test stand, an impactor apparatus, a resistor apparatus and a control module. The first, a second, and a third test stand selectively fixed to a test bench. The test bench comprises a plurality of casters, the first, second and third test stands each comprises a pulley disposed proximate a top end of each of the first, second, and third test stand. The first test stand further comprises a first pretensioner mount, a first belt displacement sensor, and a first belt damper. The third test stand further comprises a second pretensioner mount and a second belt displacement sensor. The second test stand further comprises a second belt damper. The first and second pretensioner mounts comprise one of a horizontal mount bracket and a pivot mount bracket, and a first and a second load cells.

The impactor apparatus is mounted between the second and third test stand. The impactor apparatus comprises an impactor head, a first and a second side rail, a release mechanism, and a limit switch.

The stabilizer bar selectively mounted to each of the first, second and third test stands. The resistor apparatus is further disposed on the stabilizer bar.

The resistor apparatus includes at least a first strap, a second strap, a first magnet, a second magnet, and a belt clamp. A first end of the first strap is fixed to the stabilizer bar. The belt clamp is fixed to a first end of the second strap and encloses the belt of the safety restraint system. The first magnet is fixed to the second end of the first strap. The second magnet is fixed to the second end of the second strap. The first and second magnets are disposed in contact and exert a magnetic force on each other.

The control module having electronic communication with the limit switch, the first and second load cells, and at least one of a lap pretensioner and a retractor pretensioner of the safety restraint system.

In one example of the present disclosure, the test bench comprises a test plate and a bed plate. The test plate is mounted to the bed plate with a first dovetail sliding joint and a first plurality of bearings is disposed between the test plate and bed plate.

In another example of the present disclosure, the first, second and third test stands are mounted to the test plate with a second, third and fourth dovetail sliding joint, respectively. A second, a third, and a fourth plurality of bearings are disposed between the first, second and third test stands and the test plate, respectively.

The above features and advantages and other features and advantages of the present disclosure are readily apparent from the following detailed description when taken in connection with the accompanying drawings.

BRIEF DESCRIPTION OF THE DRAWING

The drawings described herein are for illustration purposes only and are not intended to limit the scope of the present disclosure in any way.

FIG. 6 is a side view of a test stand of a seat belt test apparatus assembly according to the principles of the present disclosure;

FIG. 7 is cross sectional view of a seat belt test apparatus assembly according to the principles of the present disclosure;

FIG. 8 is cross sectional view of a seat belt test apparatus assembly according to the principles of the present disclosure;

FIG. 12 is a perspective view of a seat belt and a portion of a resistor apparatus of a seat belt test apparatus assembly according to the principles of the present disclosure;

FIG. 13 is a cross sectional view of a seat belt and a portion of a resistor apparatus of a seat belt test apparatus assembly according to the principles of the present disclosure;

FIG. 14 is a cross sectional view of a seat belt and a portion of a resistor apparatus of a seat belt test apparatus assembly according to the principles of the present disclosure;

FIG. 15 is a cross sectional view of a seat belt and a portion of a resistor apparatus of a seat belt test apparatus assembly according to the principles of the present disclosure, and FIG. 16 is a cross sectional view of a seat belt and a portion of a resistor apparatus of a seat belt test apparatus assembly according to the principles of the present disclosure.

DESCRIPTION

The following description is merely exemplary in nature and is not intended to limit the present disclosure, application, or uses.

Figure 1:
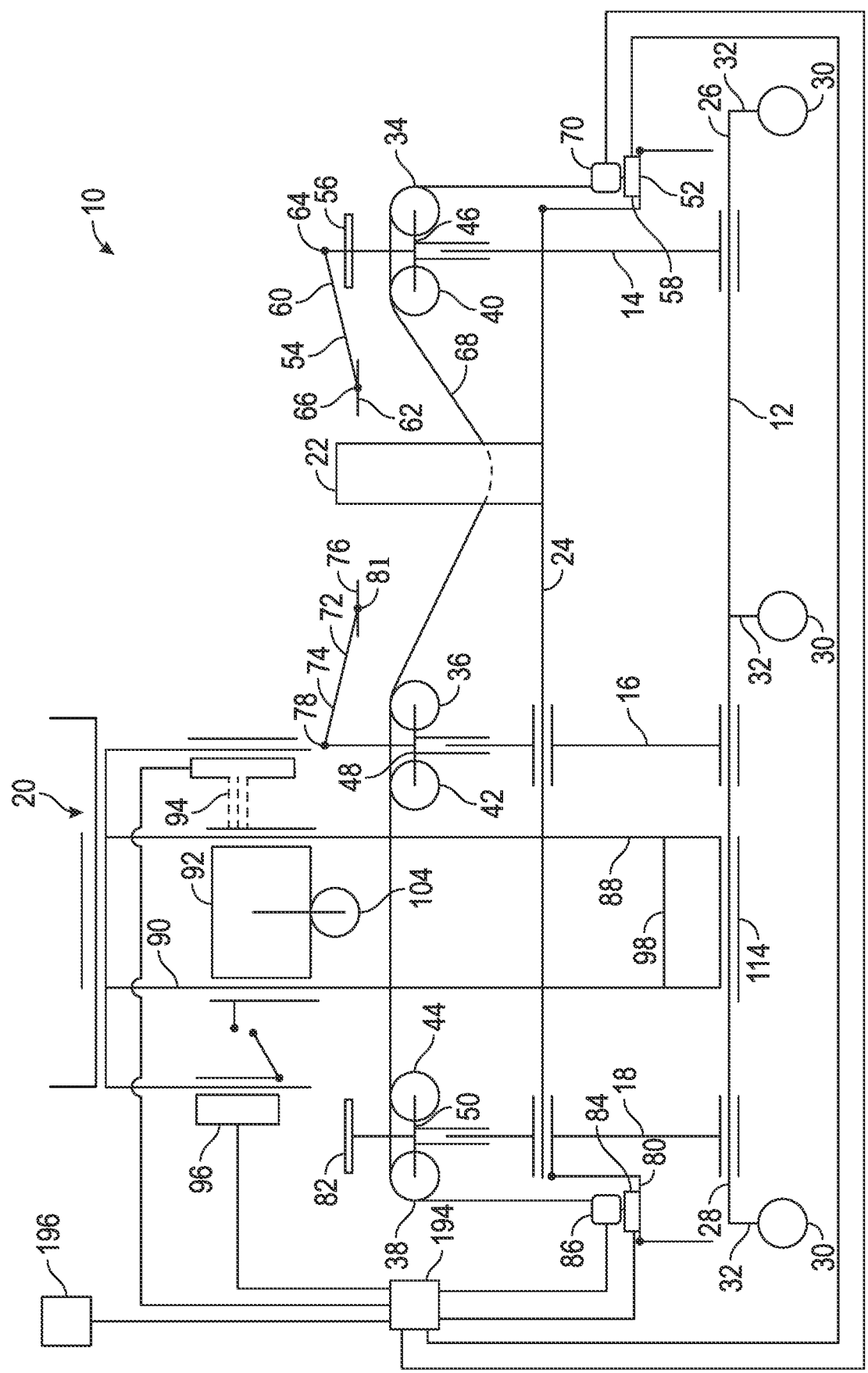
FIG. 1 is a schematic view of a seat belt test apparatus according to the principles of the present disclosure.
Figure 2:
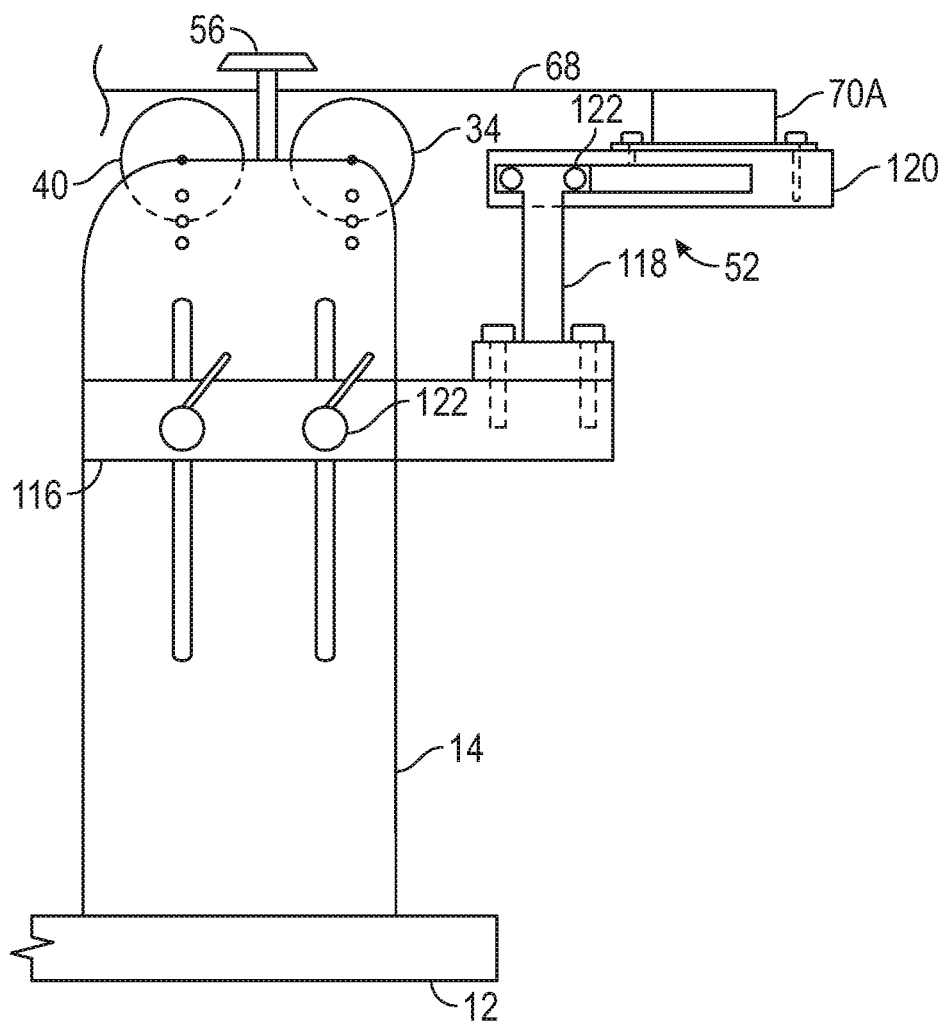
FIG. 2 is a side view of a test stand of a seat belt test apparatus assembly according to the principles of the present disclosure.

Examples of the present disclosure advantageously provide a seat belt test apparatus 10 for bench testing a seat belt or safety restraint system for a vehicle. The seat belt test apparatus 10, as illustrated in FIG. 1 and now being described, includes a test bench 12, a first, second, and third test stands 14, 16, 18, an impactor apparatus 20, a resistor apparatus 22, and a stabilizer bar 24. More particularly, each of the first, second, and third test stands 14, 16, 18 are mounted laterally on the test bench 12 spaced apart from each other. The first test stand 14 is mounted proximate a first end 26 of the test bench 12, the third test stand 18 is mounted proximate a second end 28 of the test bench 12, and the second test stand 16 is mounted to the test bench 12 between the first test stand 14 and the third test stand 18. Each of the first, second, and third test stands 14, 16, 18 are mounted to the test bench 12 such that the test stands 14, 16, 18 are capable of sliding movement along the length of the test bench 12 as well as being fixed into a testing position. The capability of lateral movement of the test stands 14, 16, 18 allows testing of variable length seat belts as is required for testing both front and rear seat belt restraint systems as well as other seat belt restraint systems. For example, other seat belt restraint systems can be tested such as systems for "captains" chairs, child seat restraint systems, and systems for large capacity vehicles such as buses and rail cars without departing from the scope of the present disclosure. The stabilizer bar 24 is a bar or other member to which the test stands 14, 16, 18 are selectively fixed for additional stabilization of the test stands 14, 16, 18. Furthermore, additional versatility of the seat belt test apparatus 10 is provided by including a plurality of castors 30 on the base 32 of the test bench 12.

Each of the first, second, and third test stands 14, 16, 18 include at least a first roller or pulley 34, 36, 38 and more preferably a second roller or pulley 40, 42, 44. The first pulleys 34, 36, 38 and second pulleys 40, 42, 44 are rotatably supported by a top portion 46, 48, 50 of each of the first, second, and third test stands 14, 16, 18. The height of each of the first pulleys 34, 36, 38 and second pulleys 40, 42, 44 is adjustable relative to the test stands 14, 16, 18.

The first test stand 14 also includes a retractor or pretensioner mount 52, a belt damper 54, and a belt displacement sensor 56. More particularly, the pretensioner mount 52 includes a load cell 58, is fixed to the first test stand 14, and is capable of multiple positions, orientations, and mounting methods (as will be described further below) so as to accommodate testing of any pretensioner design. A retractor pretensioner 70 of a safety restraint system is mounted to the load cell 58 of the pretensioner mount 52. The belt damper 54 is extended from the top portion 46 of the first test stand 14 and includes a lever member 60 and a mass 62. The lever member 60 has a first end 64 that is rotatable extended from the top portion 46 of the first test stand 14 thus positioning the mass 62, mounted to the second end 66, over the top of the belt 68 of the safety restraint system. The belt displacement sensor 56 provides a belt displacement signal to a test apparatus control unit 194 as additional data for consideration in the overall performance to the safety restraint system tested. The belt displacement sensor 56 may be based on an optical sensor but may be any type of sensor capable of providing a signal detailing the movement of the belt 68.

The second test stand 16 also includes a belt damper 72 having the same elements and function as the belt damper 54 of the first test stand 14. For example, the belt damper 72 of the second test stand 16 is extended from the top portion 48 of the second test stand 16 and includes a lever member 74 and a mass 76. The lever member 74 has a first end 78 that is rotatable extended from the top portion 48 of the second test stand 16 thus positioning the mass 76, mounted to the second end 81, over the top of the belt 68 of the safety restraint system. The belt dampers 54, 72 stop excessive flutter or vibration of the belt 68 while the test is in progress.

The third test stand 18 also includes a retractor or pretensioner mount 80 and a belt displacement sensor 82. More particularly, the pretensioner mount 80 includes a load cell 84, is fixed to the third test stand 18, and is capable of multiple positions, orientations, and mounting methods (as will be described further below) so as to accommodate testing of any retractor or pretensioner design. A lap pretensioner 86 of a safety restraint system is mounted to the load cell 84 of the pretensioner mount 80. The belt displacement sensor 82 provides a belt displacement signal to a test apparatus control unit 194 as additional data for consideration in the overall performance to the safety restraint system tested. The belt displacement sensor 82 may be based on an optical sensor but may be any type of sensor capable of providing a signal detailing the movement of the belt 68.

Figure 9:
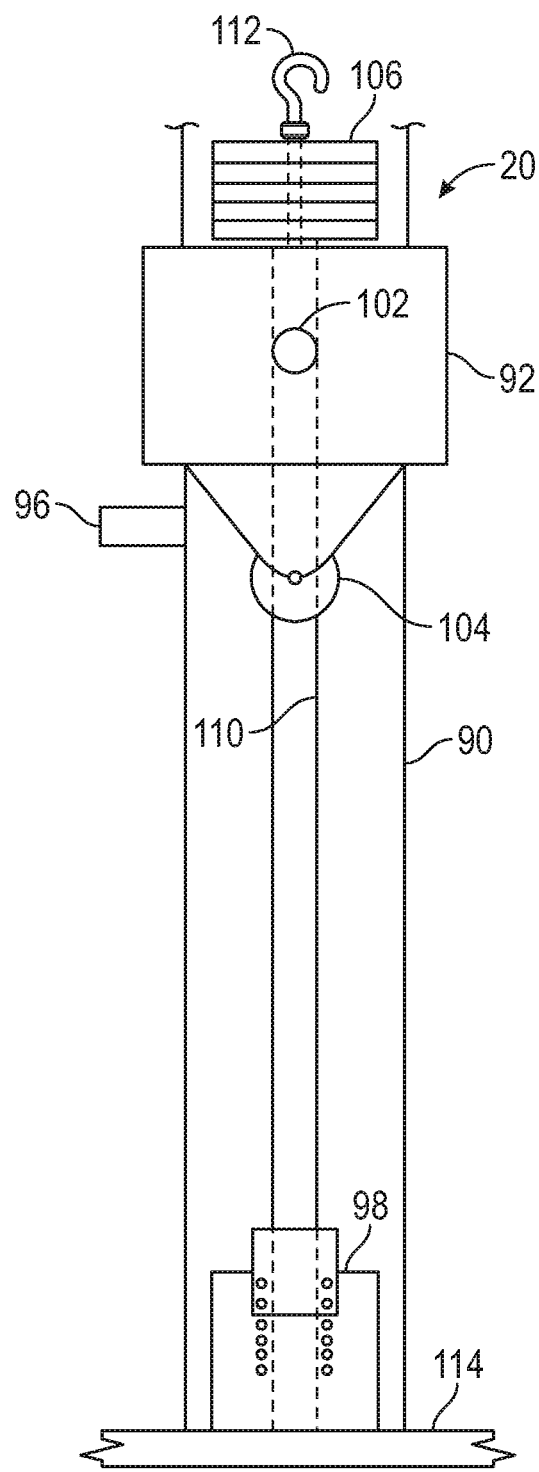
FIG. 9 is a side view of an impactor apparatus of a seat belt test apparatus assembly according to the principles of the present disclosure.
Figure 10:
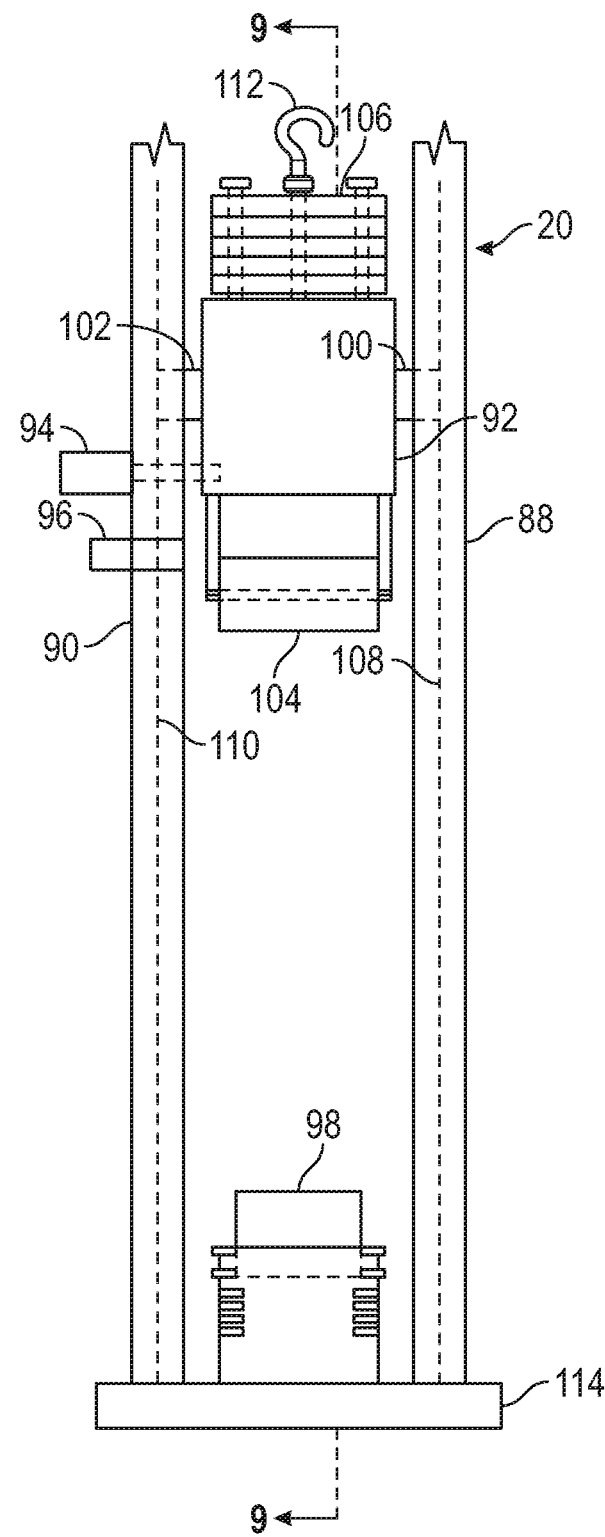
FIG. 10 is a side view of an impactor apparatus of a seat belt test apparatus assembly according to the principles of the present disclosure.

The impactor apparatus 20, as shown schematically in FIG. 1 and in more detail in FIGS. 9 and 10, is set to fall upon the belt 68 between the second and third test stands 16, 18 which simulates the forward momentum of a vehicle occupant moving forward into the safety restraint system during a crash or other deceleration event. The impactor apparatus 20 includes a first and second vertical rails 88, 90, an impactor head 92, a release mechanism 94, a limit switch 96, and a safety stop 98. More particularly, The impactor head 92 includes a first and second rail pins 100, 102, at least a first pulley or roller 104, and a weight storage 106. The first and second vertical rails 88, 90 are disposed spaced apart on a base 114 and extended vertically and parallel. The first and second rail pins 100, 102 are slidingly disposed in a first and second slots 108, 110 of the first and second vertical rails 88, 90, respectively. The weight storage 106 on top of the impactor head 92 allows for weight to be added or removed from the impactor head 92 to assess the impact of variable weight on the safety restraint system to verify the safety of vehicle occupants of having various weights.

The release mechanism 94 controls the release of the impactor head 92 relative to the first and second vertical rails 88, 90 after the impactor head 92 has been raised into a suspended position via a hook 112 and overhead crane (not shown). The limit switch 96 is disposed on one of the first and second vertical rails 88, 90 and is triggered by the impactor head 92 as it travels toward the belt 68 after the release mechanism 94 has been triggered. Preferable rarely required, the safety stop 98 is disposed on the base 114 between the first and second vertical rails 88, 90 and provides a landing spot for the impactor head 92 in the case that the belt 68, the retractor pretensioner 70, lap pretensioner 86, or some other mechanism of the safety restraint system fails through the course of the test. The safety stop 98 is height adjustable to account for safety restraint systems using alternative torsion bar energy absorption mechanisms.

The impactor apparatus 20 can be integrated with the test bench 12 and test stands 14, 16, 18 as shown in FIG. 1 or it can be a stand-alone apparatus as shown in FIGS. 9 and 10. In either method of set-up, the impactor apparatus 20 provides the versatility to simulate vehicle occupants accelerating into the belt 68 of the safety restraint system without the cost and timing of testing safety restraint systems in actual vehicle impact tests.

Turning now to FIGS. 2-5, the first test stand 14 is illustrated in more detail and will now be described. As stated above, the first test stand 14 is mounted to the test bench 12 and includes the retractor or pretensioner mount 52, the belt displacement sensor 56. The pretensioner mount 52 includes a first bracket or member 116, a second bracket or member 118, and a third bracket or member 120. The first bracket 116 is selectively fixed to the first test stand 14 through a quick release fastener system 122. The first bracket 116 is capable of being raised or lowered as required by the specific safety restraint system being tested. The second bracket 118 is fastened to the first bracket 116. The third bracket 120 is selectively fixed to the second bracket 118 using a similar quick release fastening system 122. The third bracket 120 is capable of being adjusted in a lateral direction relative to the second bracket 118 and the first test stand 14. Included with the third bracket 120 is the load cell 58 for detecting the dynamic load in the retractor pretensioner 70A of the safety restraint system during the test. While the present disclosure contemplates a first, second, and third brackets 116, 118, 120 for the first test stand 14, other arrangements for mounting the retractor pretensioner 70A of the safety restraint system to the first test stand 14 do not fall outside the scope of this disclosure. For example, integrating two or more of the brackets into a single bracket for supporting the retractor pretensioner 70A also is contemplated by the present disclosure.

Figure 3:
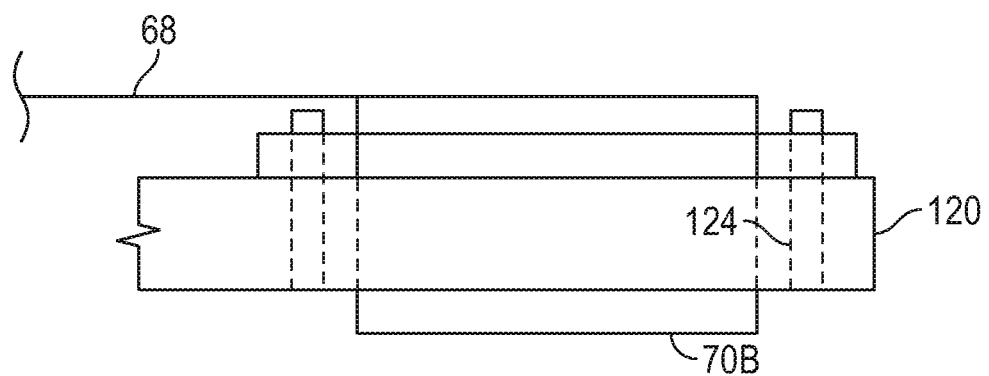
FIG. 3 a side view of an alternative seat belt retractor mount of a test stand of a seat belt test apparatus assembly according to the principles of the present disclosure.
Figure 4:
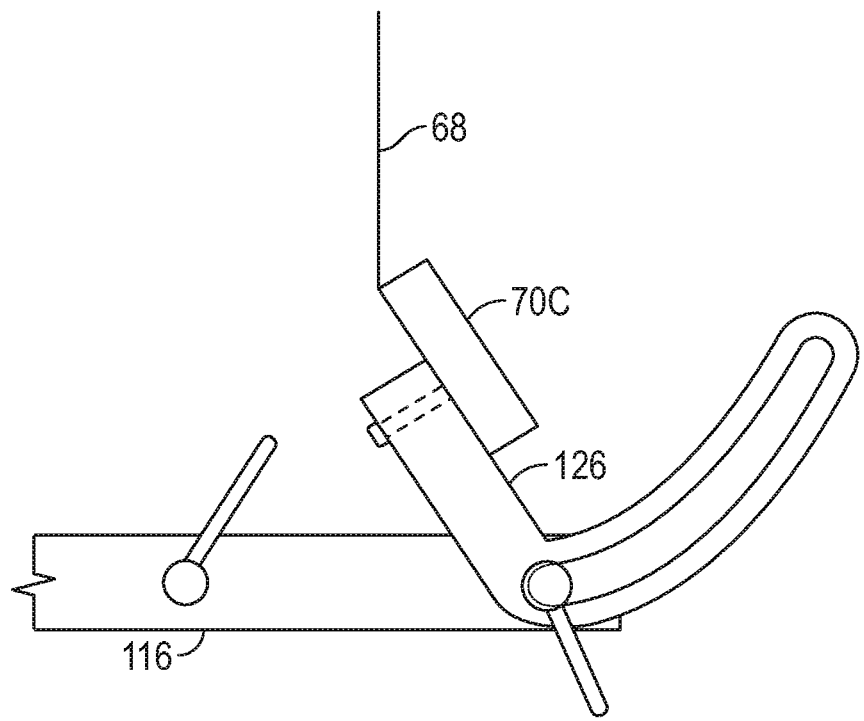
FIG. 4 a side view of an alternative seat belt retractor mount of a test stand of a seat belt test apparatus assembly according to the principles of the present disclosure.
Figure 5:
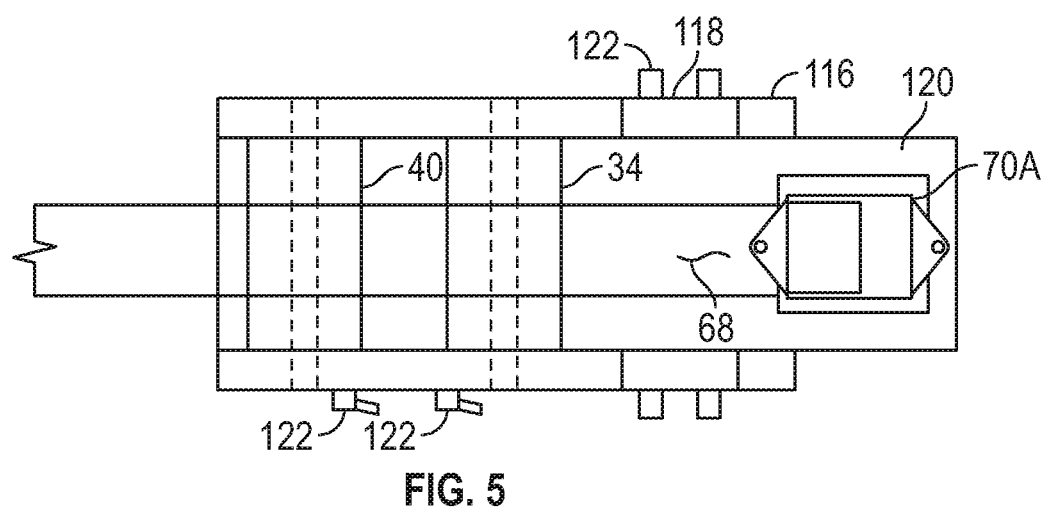
FIG. 5 is a top view of an alternative seat belt retractor mount of a test stand of a seat belt test apparatus assembly according to the principles of the present disclosure.

As shown in FIGS. 3 and 4, other arrangements of the pretensioner mount 52 are illustrated. FIG. 3 shows a retractor pretensioner 70B mounted to the third bracket 120 with the pretensioner predominantly disposed in an opening 124 of the third bracket 120. FIG. 4 shows a fourth bracket 126 pivotably mounted to the first bracket 116 in order to provide the versatility to test a retractor pretensioner 70C at any angle.

Turning now to FIGS. 6-8, a portion of the seat belt test apparatus 10 is illustrated. The seat belt test apparatus 10 includes the test bench 12, test stands 14, 16, 18 and stabilizer bar 24. Shown in more detail in FIG. 7 is the test bench 12 includes a test plate 128 and a bed plate 130. The castors 30 described above are attached to the lower surface 131 of the bed plate 130. The test plate 128 is slidingly mounted to the bed plate 130 made possible through a dovetail sliding joint 132. A plurality of quick release fasteners 134, one of which is shown, enabled the test plate 128 to be locked to the bed plate 130 with little effort. Included in the dovetail sliding joint 132 is a plurality of bearings 136 to provide for ease of adjustment. In FIG. 8, the second test stand 16 is slidingly mounted to the test plate 128 through another dovetail sliding joint 138. Again, a plurality of bearings 140 are included in the dovetail sliding joint 138 to improve the ability to move the heavy components relative to each other. Another set of quick release fasteners 142 selectively lock the second test stand 16 into place. A similar arrangement is duplicated for each of the first and third test stands 14, 18.

Referring now to FIGS. 11-16, another portion of the seat belt test apparatus 10 is illustrated. As described previously, the seat belt test apparatus 10 includes a resistor apparatus 22 disposed between the first and second test stands 14, 16. The resistor apparatus 22 applies a load to the belt 68 prior to release of the impactor head 92 and is disposed between the first and second test stands 14, 16. The resistor apparatus 22 includes a plurality of resistor straps 144 each having a lower strap 146, an upper strap 148, a lower magnet 150, an upper magnet 152, and a belt clamp 154. The first end 156 of the lower strap 146 is fixed to the stabilizer bar 24. The lower magnet 150 is fixed to the second end 158 of the lower strap 146. The upper strap 148 has a first end 160 fixed to the upper magnet 152 and a second end 162 fixed to the belt clamp 154. The belt clamp 154 encloses the belt 68 to effectively fix the resistor straps 144 to the belt 68. The upper strap 148 of each of the resistor straps 144 has a variable length such that the belt 68 has a "V" shape between the first and second test stands 14, 16.

Another example of a resistor strap 164 of a resistor apparatus 22 is illustrated in FIGS. 14 and 15. The resistor strap 164 includes a strap 166 and a belt clamp 168. The strap 166 is connected to the stabilizer bar 24 on the lower end (not shown) and to the belt clamp 168 on the upper end 180. The belt clamp 168 includes a lower member 172, a first and second upper members 174, 176. The first and second upper members 174, 176 are hinged to the ends of the lower member 172. The hinges 178 are rated to open when a specified load is applied to the first and second upper members 174, 176 from the belt 68. FIG. 14 shows the resistor strap 164 prior to the test while FIG. 15 shows the resistor strap 164 after the impactor head 92 has dropped the belt clamp 168 has opened.

Figure 11:
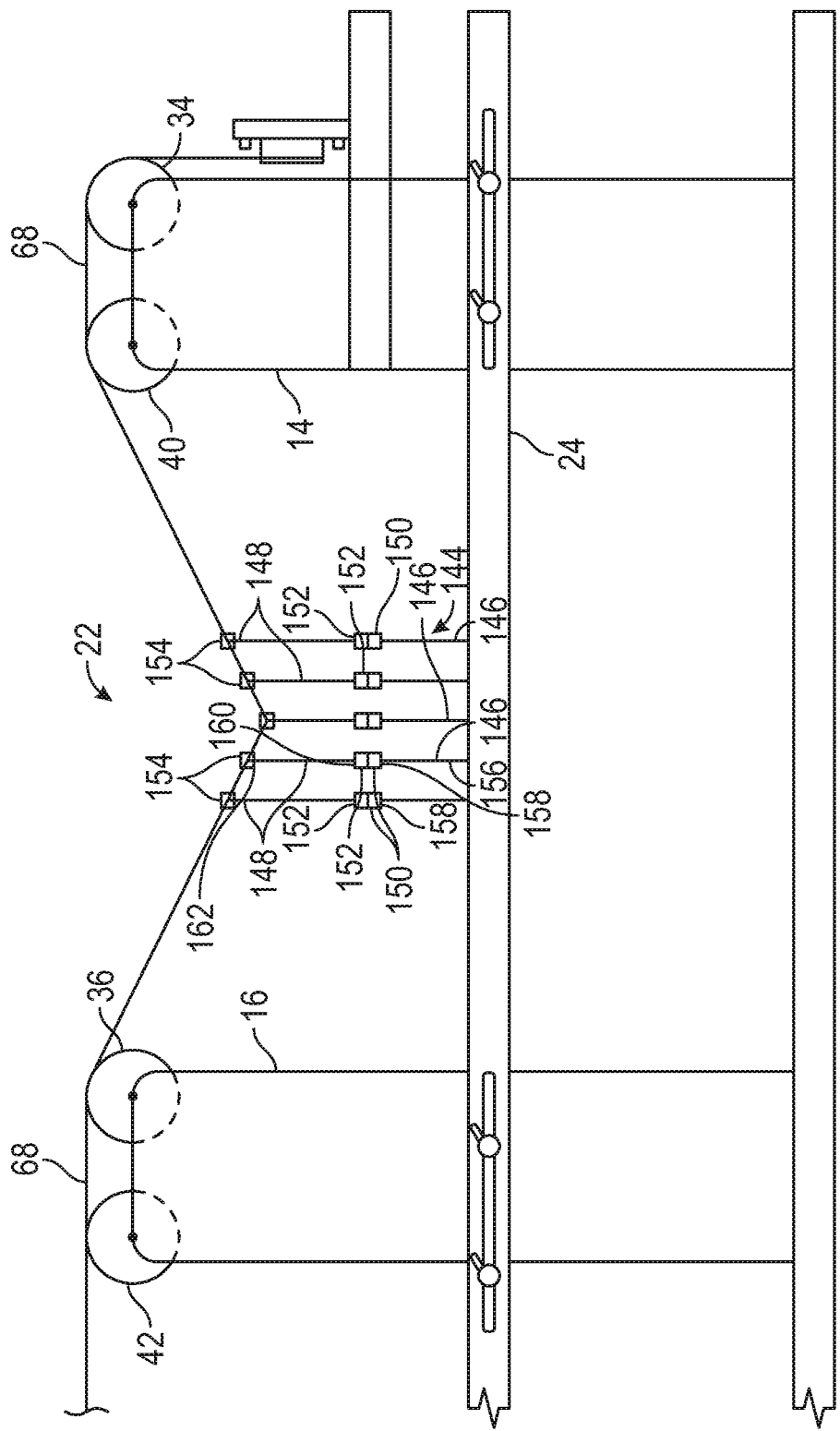
FIG. 11 is a side view of a test stand of a seat belt test apparatus assembly according to the principles of the present disclosure.

Turning now to FIG. 16 with continuing reference to FIG. 11, another example of a resistor strap 182 is illustrated. The resistor strap 182 has a first end (not shown) connected to the stabilizer bar 24, as second end 184, and an upper and lower magnets 186, 188. The second end 184 is fixed to the lower magnet 186 while the upper magnet 188 is tethered to the resistor strap 182 and placed on the upper surface 190 of the belt 68 with the lower magnet 186 placed on the lower surface 192 of the belt 68. The magnetic field generated between the upper and lower magnets 186, 188 keeps them in contact with the belt 68 until the magnetic field strength is overcome by the retractor pretension force prior to or during the impactor head 92 striking the belt 68. The magnets 186, 188 can be instrumented by a contact switch allowing the control module 194 to measure the time of separation of the magnets 186, 188.

Returning now to FIG. 1, seat belt test apparatus 10 also includes a control module 194 in electrical communication with several of the components of the seat belt test apparatus 10. For example, The control module 194 may be in communication with each of the load cell 58 of the pretensioner mount 52 of the first test stand 14, the load cell 84 of the pretensioner mount 80 of the third test stand 18, the limit switch 96, the release mechanism 94, the retractor pretensioner 70, and the lap pretensioner 86. A data output mechanism 196 is also connected to the control module 194 to display output data recorded during a test.

For operation of the seat belt test apparatus 10, the various components are mounted as shown in FIG. 1. The lap pretensioner 86 is secured to the pretensioner mount 80 of the third test stand 18 while the retractor pretensioner 70 is secured to the pretensioner mount 52 of the first test stand 14. The belt 68 is suspended over the pulleys 34, 36, 38, 40, 42, 44 of the first, second, and third test stands 14, 16, 18 with the resistor apparatus 22 applying a load to the belt 68 between the first and second test stands 14, 16. A test operator will initial the test by triggering the release mechanism 94 thus causing the impactor head 92 to fall vertically. As it falls, the impactor head 92 engages the limit switch 96, causing the control module 194 to energize the pretensioner of one of the lap pretensioner 86 or retractor pretensioner 70 thus removing the slack that had been introduced into the belt 68 by the downward pull of the resistor apparatus 22. As the pulley 104 of the impactor head 92 engages the belt 68, the resistor apparatus 22 no longer applies a vertical force on the belt 68. The performance of the safety restrained system is judged by the data collected by the control module 196 of the forces observed by the load cells 58, 84.

While examples have been described in detail, those familiar with the art to which this disclosure relates will recognize various alternative designs and examples for practicing the disclosed structure within the scope of the appended claims.

The following is claimed:

1. A seat belt test apparatus for testing a safety restraint system for a vehicle, the seat belt test apparatus comprising:
  a first, a second, and a third test stand selectively fixed to a test bench, and wherein the first, second and third test stands each comprise a pulley disposed proximate a top end of each of the first, second, and third test stand, the first test stand further comprises a first pretensioner mount, and the third test stand further comprises a second pretensioner mount;

an impactor apparatus mounted between the second and third test stand, and wherein the impactor apparatus comprises an impactor head, a first and a second side rail, a release mechanism, and a limit switch; and a resistor apparatus disposed between the first and second test stands, the resistor apparatus comprising a mass disposed on a belt of the safety restraint system, wherein the first pretensioner mount comprises one of a horizontal mount bracket and a pivot mount bracket.

2. The seat belt test apparatus of claim 1 further comprising a stabilizer bar selectively mounted to each of the first, second and third test stands and wherein the resistor apparatus is further disposed on the stabilizer bar.

3. The seat belt test apparatus of claim 2 wherein resistor apparatus further comprises at least a first strap, a second strap, a first magnet, a second magnet, and a belt clamp, a first end of the first strap is fixed to the stabilizer bar, the belt clamp is fixed to a first end of the second strap and encloses the belt of the safety restraint system, the first magnet is fixed to the second end of the first strap, the second magnet is fixed to the second end of the second strap, and the first and second magnets are disposed in contact and exert a magnetic force on each other.

4. The seat belt test apparatus of claim 1 wherein each of the first and second pretensioner mounts comprises one of a first and a second load cells.

5. The seat belt test apparatus of claim 4 wherein the first and third test stands further comprise a first and second belt displacement sensor disposed on the top end of the first and third test stands, respectively.

6. The seat belt test apparatus of claim 5 further comprising a control module having electronic communication with the limit switch, the first and second load cells, and at least one of a lap pretensioner and a retractor pretensioner of the safety restraint system.

7. The seat belt test apparatus of claim 1 wherein each of the first and second test stands further comprises one of a first and a second belt damper.

8. The seat belt test apparatus of claim 1 wherein the test bench comprises a test plate and a bed plate, the test plate is mounted to the bed plate with a first sliding joint and a first plurality of bearings is disposed between the test plate and bed plate.

9. The seat belt test apparatus of claim 8 wherein the first, second and third test stands are mounted to the test plate with a second, third and fourth sliding joint, respectively, and a second, a third, and a fourth plurality of bearings are disposed between the first, second and third test stands and the test plate, respectively.

10. A seat belt test apparatus for testing a safety restraint system for a vehicle, the seat belt test apparatus comprising:

a first, a second, and a third test stand selectively fixed to a test bench, and wherein the first, second and third test stands each comprises a pulley disposed proximate a top end of each of the first, second, and third test stand, the first test stand further comprises a first pretensioner mount and a first belt displacement sensor, the third test stand further comprises a second pretensioner mount and a second belt displacement sensor, and each of the first and second pretensioner mounts comprises one of a first and a second load cells;

an impactor apparatus mounted between the second and third test stand, and wherein the impactor apparatus comprises an impactor head, a first and a second side rail, a release mechanism, and a limit switch;

a resistor apparatus disposed between the first and second test stands, the resistor apparatus comprising a mass disposed on a belt of the safety restraint system;

a stabilizer bar selectively mounted to each of the first, second and third test stands and wherein the resistor apparatus is further disposed on the stabilizer bar; and a control module having electronic communication with the limit switch, the first and second load cells, and at least one of a lap pretensioner and a retractor pretensioner of the safety restraint system.

11. The seat belt test apparatus of claim 10 wherein resistor apparatus further comprises at least a first strap, a second strap, a first magnet, a second magnet, and a belt clamp, a first end of the first strap is fixed to the stabilizer bar, the belt clamp is fixed to a first end of the second strap and encloses the belt of the safety restraint system, the first magnet is fixed to the second end of the first strap, the second magnet is fixed to the second end of the second strap, and the first and second magnets are disposed in contact and exert a magnetic force on each other.

12. The seat belt test apparatus of claim 10 wherein each of the first and second test stands further comprises one of a first and a second belt damper.

13. The seat belt test apparatus of claim 10 wherein the first pretensioner mount comprises one of a horizontal mount bracket and a pivot mount bracket.

14. The seat belt test apparatus of claim 10 wherein the test bench comprises a test plate and a bed plate, the test plate is mounted to the bed plate with a first sliding joint and a first plurality of bearings is disposed between the test plate and the bed plate.

15. The seat belt test apparatus of claim 10 wherein the first, second and third test stands are mounted to the test plate with a second, third and fourth sliding joint, respectively, and a second, a third, and a fourth plurality of bearings are disposed between the first, second and third test stands and the test plate, respectively.

16. A seat belt test apparatus for testing a safety restraint system for a vehicle, the seat belt test apparatus comprising:

a first, a second, and a third test stand selectively fixed to a test bench, and wherein the test bench comprises a plurality of casters, the first, second and third test stands each comprises a pulley disposed proximate a top end of each of the first, second, and third test stand, the first test stand further comprises a first pretensioner mount, a first belt displacement sensor, and a first belt damper, the third test stand further comprises a second pretensioner mount and a second belt displacement sensor, the second test stand further comprises a second belt damper, and the first and second pretensioner mounts comprise one of a horizontal mount bracket and a pivot mount bracket, and a first and a second load cells;

an impactor apparatus mounted between the second and third test stand, and wherein the impactor apparatus comprises an impactor head, a first and a second side rail, a release mechanism, and a limit switch;

a stabilizer bar selectively mounted to each of the first, second and third test stands, and wherein the resistor apparatus is further disposed on the stabilizer bar;

a resistor apparatus disposed between the first and second test stands, the resistor apparatus comprises at least a first strap, a second strap, a first magnet, a second magnet, and a belt clamp, a first end of the first strap is fixed to the stabilizer bar, the belt clamp is fixed to a first end of the second strap and encloses the belt of the safety restraint system, the first magnet is fixed to the second end of the first strap, the second magnet is fixed to the second end of the second strap, and the first and second magnets are disposed in contact and exert a magnetic force on each other, and a control module having electronic communication with the limit switch, the first and second load cells, and at least one of a lap pretensioner and a retractor pretensioner of the safety restraint system.

17. The seat belt test apparatus of claim 16 wherein the test bench comprises a test plate and a bed plate, the test plate is mounted to the bed plate with a first sliding joint and a first plurality of bearings is disposed between the test plate and the bed plate.

18. The seat belt test apparatus of claim 17 wherein the first, second and third test stands are mounted to the test plate with a second, third and fourth sliding joint, respectively, and a second, a third, and a fourth plurality of bearings are disposed between the first, second and third test stands and the test plate, respectively.

* * * * *